United States Patent Office 3,262,113
Patented July 19, 1966

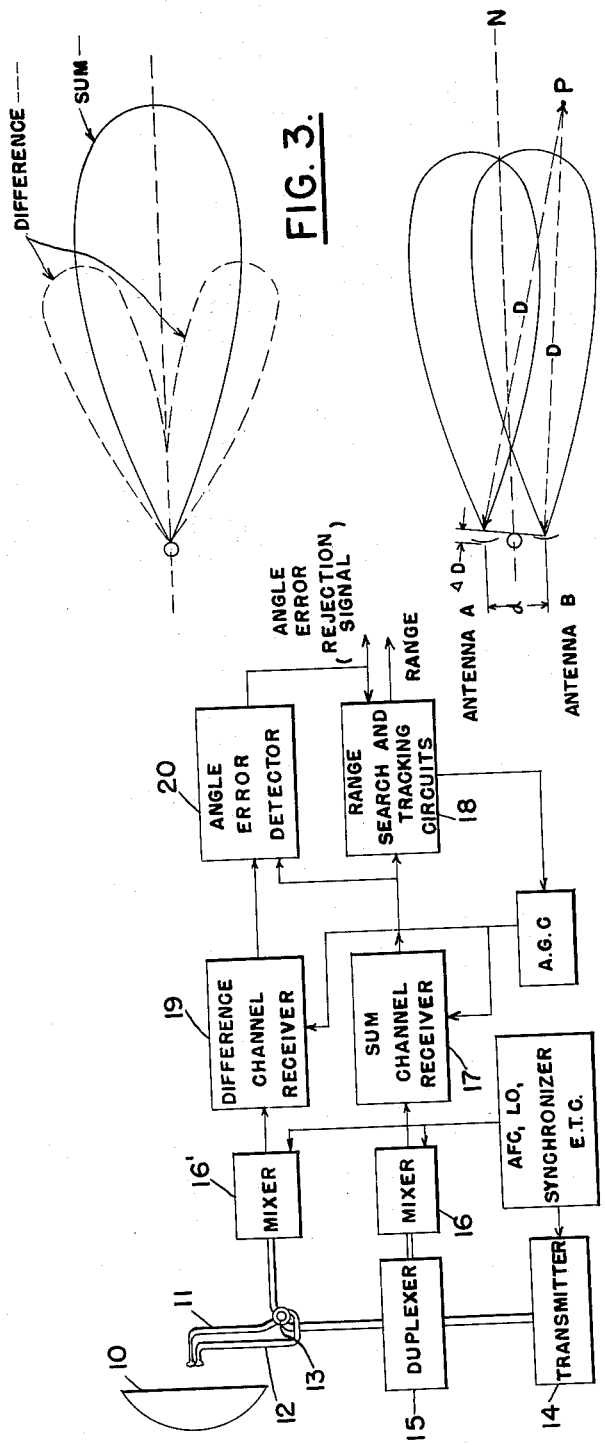

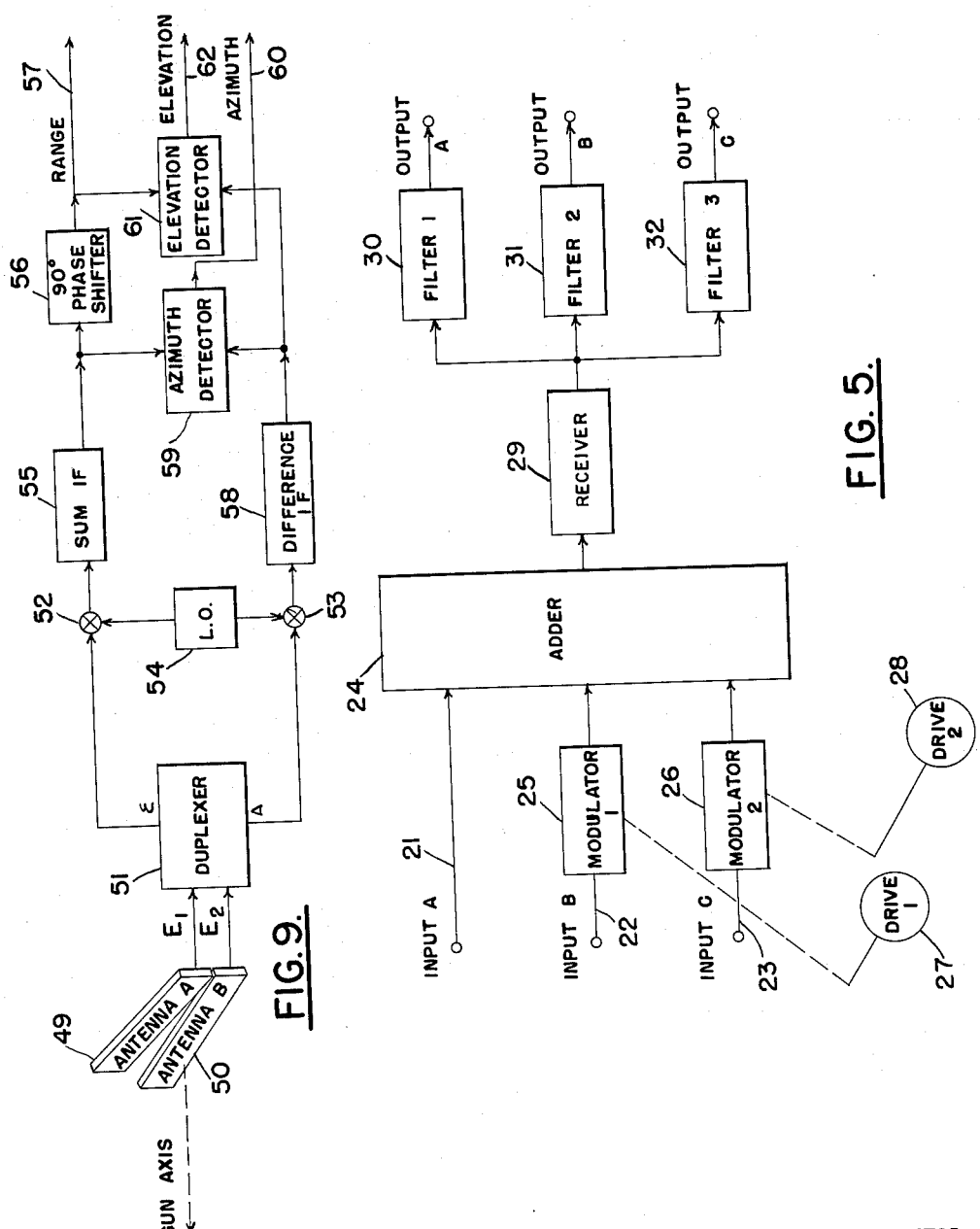

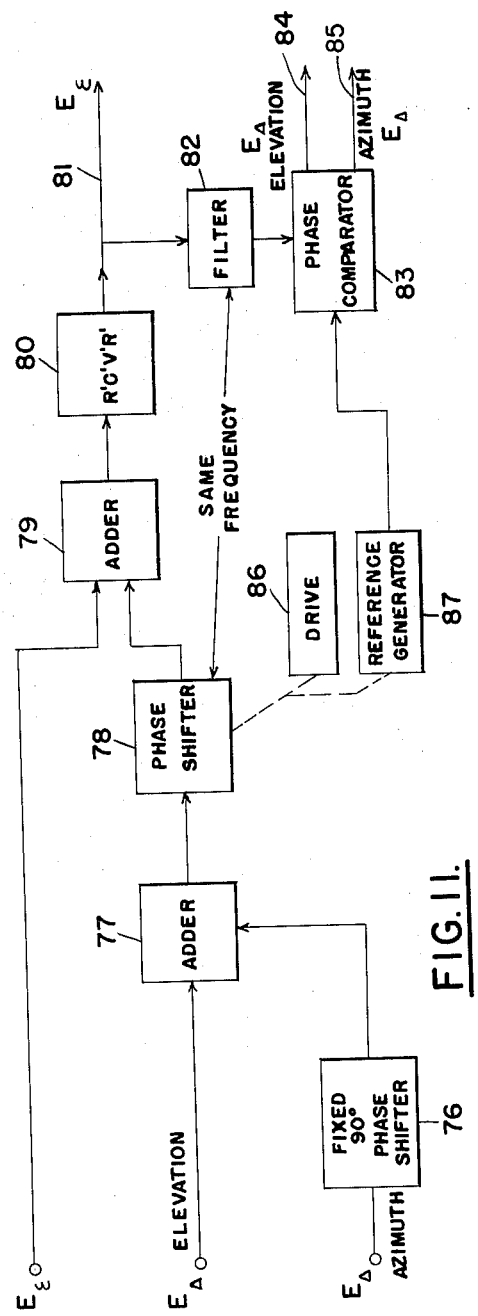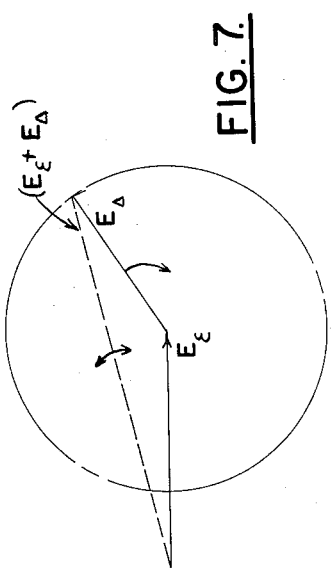

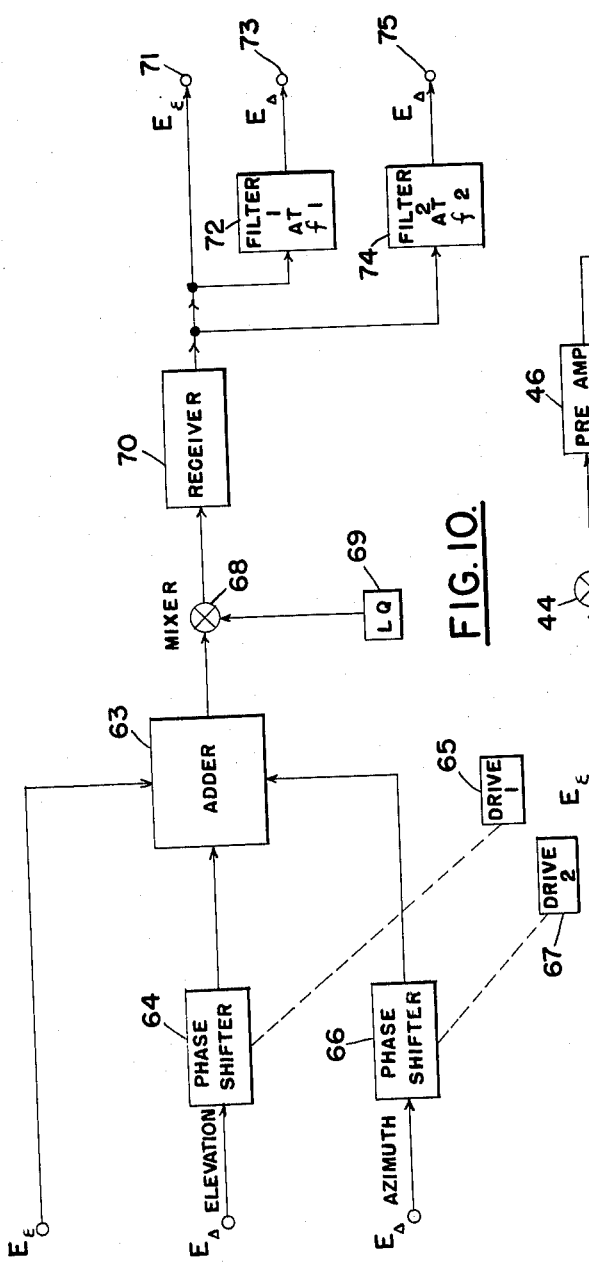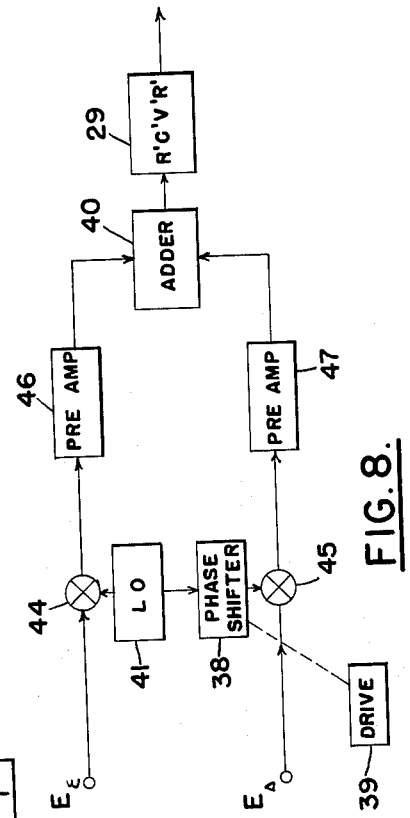

3,262,113
THRU-CHANNEL MONOPULSE RADAR DIRECTIONAL CONTROL SYSTEM
Murray Hefter, Far Rockaway, and Judd Blass, Bayside, N.Y., assignors, by mesne assignments, to the United States of America as represented by the Secretary of the Army
Filed Aug. 25, 1961, Ser. No. 136,133
1 Claim. (Cl. 343—16)

This invention relates to radar systems. Its purpose is to provide an improved radar system which is useful for, but not necessarily limited to, controlling the gunfire of tanks and the like.

It is well known that the function of a directional control radar system of the above type is to provide information respecting the range, elevation and azimuth of a target. In accomplishing this function, it transmits a sequence of short pulses of high-frequency energy which are reflected back from the target to the transmitter. The time taken for this round trip of the pulses is obviously a measure of the distance between the transmitter and the target and the received pulses also provide directional information that is converted into forms suitable for controlling the aiming of a gun.

The design of such a system is determined to a considerable extent by the conditions under which it is to be operated. Thus in the case of its use on an armored vehicle such as a tank, it is desirable that (1) its antenna be fixed and of a size and shape to minimize its exposure to gunfire and to contact with extraneous objects such as the limbs of trees, (2) its electrical circuits be simplified to the greatest possible extent, and (3) its operation be unaffected by such mechanical vibration and shock as are incident to the operation of the vehicle.

The present invention accomplishes these results by the provision of an improved gunfire control radar system which may be of the amplitude monopulse or the phase monopulse type. This improved system has the important advantage that, instead of separate receivers, it utilizes a single receiver which is common to sum (or range) and difference (or error) signal channels provided therein. A further advantage of this improved system is that it permits the use of a stationary antenna which may be so designed and located with respect to the vehicle armor as to minimize the vulnerability of the antenna to gunfire and accidental contact with extraneous objects.

The invention will be better understood from the following description when considered in connection with the accompanying drawings, and its scope is indicated by the appended claim.

Referring to the drawings:

FIG. 1 is a block diagram of the schematic circuit of a typical amplitude monopulse radar system to which the present invention may be applied;

FIG. 2 illustrates the transmitted beams set-up by the two individual antennas of an amplitude monopulse radar system. Since both antennas are transmitting simultaneously they act as an array to effectively produce a single lobed beam pattern as illustrated by the sum pattern of FIG. 3;

FIG. 3 shows the effective radiation as seen by the sum and difference channels of the receiver of an amplitude monopulse radar system;

FIG. 4 illustrates the transmitted beam set-up of a phase monopulse radar system. Since both antennas are transmitting simultaneously, they act as an array to effectively produce a single lobed beam pattern similar to the sum pattern illustrated in FIG. 3;

FIG. 5 is a block circuit diagram illustrating a basic signal-translating portion of a radar system embodying the present invention;

FIG. 7 is an explanatory vector diagram relating to the operation of the system of FIG. 6;

FIG. 8 is a block circuit diagram showing a modification of a portion of the radar system of FIG. 6;

FIG. 9 is a block circuit diagram which illustrates a type of two plane combination amplitude and phase monopulse radar system, for which the invention is adapted, having one sum and one difference signal channel;

FIG. 10 is a block circuit diagram showing a modification of the invention which provides a simplification of a three channel type (2-plane) monopulse system; and FIG. 11 is a block circuit diagram showing a further modification of the invention which also provides a simplified three-channel (2-plane) monopulse system.

Figure 6:
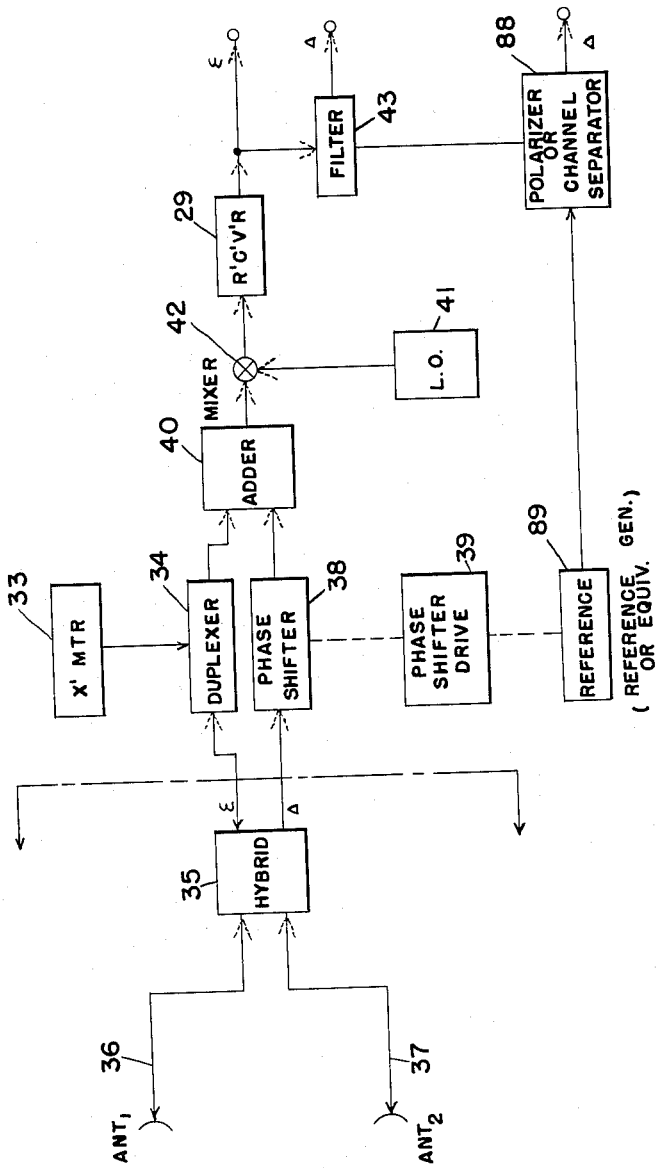
FIG. 6 is a block circuit diagram showing the application of the invention to a monopulse fire control radar system which is arranged to detect angular deviation in one plane only.

The typical monopulse radar system of FIG. 1 is arranged to detect angular deviations in one plane only, although the technique may be extended to two planes. In this case a lens 10 employs two waveguides or feeds 11 and 12 which if excited separately would produce two beams with a small angular separation. When transmitting, the two feeds are excited from a transmitter 14 through a duplexer 15 and a waveguide hybrid 13 equally and in phase so that effectively a single beam is transmitted. A lens is indicated for forming the beam but a reflector or dual antenna would serve as well.

The signals received by the two feeds are added in the hybrid 13 to produce a sum channel signal $\epsilon$. This signal is applied through the duplexer 15, a mixer 16, a sum channel receiver 17 and range search and tracking circuits 18, and is used in a well understood manner for determining target range.

The hybrid 13 also produces a difference-signal voltage $\Delta$ equal to the difference of the voltages received by the two feeds. This difference voltage is applied through a mixer 16′, a difference channel receiver 19 and an angle error detector 20, and is used to correct the axis of bore sighting of the system in a well understood manner.

For a target precisely on the antenna axis, the signals received by the two feeds are equal and in phase, and the difference signal is zero. For a target off the axis, the feeds receive unequal signals, and the angular deviation is indicated in the difference channel by a voltage proportional to the displacement.

The system of FIG. 1 may be considered to be an amplitude monopulse system, wherein angular errors are detected from the difference in the amplitudes of the signals received by the two feeds. Phase monopulse is an alternate but similar system in which the beams corresponding to the two feeds have the same direction but have their phase centers displaced laterally. Signals received by the two feeds are equal in amplitude but different in phase an amount proportional to the angular deviation. The difference channel voltage produced by the hybrid is also proportional to the target displacement.

FIG. 2 shows the two radiation patterns generated by an amplitude monopulse system. These patterns point in slightly different directions giving rise to a crossover level of —1.5 db to —3 db depending on the system parameters. When transmitting, the two antennas are fed in phase. When receiving, the antennas are so connected that both the sum and the difference of the antenna inputs are available in the system. FIG. 3 shows the effective radiation patterns as seen by the sum and difference channels of the receiver. The radiation pattern during transmission is the same as that of the sum channel. These are one way patterns. In two way transmission, the sum channel of the receiver sees the product of the square of the sum pattern while the difference channel of the receiver sees the product of the sum pattern and the difference pattern. The sum channel is the range channel (like that of the conventional radar) whereas the difference channel provides off-axis information.

FIG. 4 illustrates the transmitted beam set-up of a phase monopulse system. This system makes use of two identical antennas whose effective centers are displaced by a distance "d." Since the distance from antenna to the target P is very much larger than the spacing "d" between the antennas, and both beams are pointed in the same direction, the gain of both antennas in any direction "P" are effectively equal. If $\phi$ is the angle between the center line and OP, $\Delta D$ (the phase difference in path length) equals $$\frac{2\pi d}{\lambda} \sin \phi$$

and $$\sin \phi = \frac{\Delta D \lambda}{2\pi d}$$

Since small angles are involved, $\sin \phi = \phi$, and $$\phi = \frac{\Delta D \lambda}{2\pi d}$$

The angle $\phi$ is therefore a linear function of $\Delta D$.

The amplitude monopulse and phase monopulse systems have comparable sensitivity. The choice of the system used is a matter of practical utilization rather than theoretical sensitivity.

In the conventional amplitude monopulse system of FIG. 1, one receiver is used for the sum or range channel and another receiver is used for the difference or error channel. If the system requires error information in two planes (elevation and azimuth) two error channel receivers are usually, but not always necessary. If proportional information is required, it is necessary that the various receivers have identical phase and/or amplitude (depending upon the type of system) characteristics throughout their dynamic range and under all operating conditions. Such receivers are very difficult to build.

The basic signal-translating circuit of FIG. 5 has three signal input channels 21, 22 and 23 leading from any suitable source such as a monopulse antenna system of the type described. The channel 21 feeds into an adder 24, the channel 22 feeds into the adder 24 through a modulator or modulator means 25, and the channel 23 feeds into the adder 24 through a second modulator or modulator means 26. The modulator 25 has a drive means or drive 27 and the second modulator 26 has a second driver means or drive 28. The combined signal output of the adder 24 is amplified by a signal receiver 29 which is connected with and delivers its composite signal output to three filters 30, 31 and 32. These filters are each tuned to pass the signal of a different channel, the filter 31 being tuned to the frequency of the drive 27 and the filter 32 being tuned to the frequency of the drive 28. A single receiver is thus provided to derive three signals for control purposes, rather than one receiver for each control signal as in the circuit of FIG. 1, for example.

FIG. 6 illustrates the application of the basic systems of FIGS. 1 and 9 to a monopulse fire control system. This system includes a transmitter 33 from which short pulses of high frequency energy are conducted through a duplexer 34 and a hybrid 35 to a monopulse antenna 36–37, the transmitted signal being indicated by full line arrow heads and the received signals being indicated by broken line arrow heads.

The received output of the hybrid 35 consists of a sum signal $\epsilon$ and a difference or error signal $\Delta$. A continuous 360° rotary-type phase shifter 38, having a drive means or drive 39, is inserted in the difference signal channel and driven at a rate commensurate with the overall system parameters. The sum signal and the phase modulated difference signal are then added in an adder 40 as indicated by the two-channel input connection therewith and by the vector diagram of FIG. 7. The resultant vector ($E\epsilon + E\Delta$) will then have a modulation component proportional to the size of the error or difference signal. The frequency of the modulation will be a function of the rate at which the phase shifter 38 is varied. This single signal is then converted by a local oscillator 41 and a mixer 42 to an intermediate-frequency signal which is amplified by the amplifier or receiver means 29, is separated by a narrow band-pass filter 43, and delivered through a polarizer or channel separator 88 connected to a reference generator 89 or the like which provides the proper reference signal at the phase-shift frequency in this case.

The error channel can be modulated either in the signal arm, as in the system of FIG. 6, or in one arm of the local oscillator 41 if two mixers 44 and 45 and two pre-amplifiers 46 and 47 are used as indicated in FIG. 8.

FIG. 9 illustrates a conventional two channel monopulse system wherein two apertures 49 and 50 are so placed that they produce two divergent radiation patterns which have a common center of radiation in one plane, but overlap and have separated centers of radiation in the other plane. The antenna may be in the form of two rectangular apertures, a lens or reflector type of antenna with two feeds, two forms or the like.

The received sum signal $\epsilon$ and difference signal $\Delta$ are passed through a duplexer 51 to mixers 52 and 53 where they are converted to an intermediate frequency by means of an oscillator 54. Thereafter the sum or range signal $\epsilon$ is passed through an intermediate frequency amplifier 55, and a 90° phase shifter 56 to the range output terminal 57. The difference or error signal is passed through an intermediate frequency amplifier 58, its azimuth component is detected by a detector 59 and delivered to an output terminal 60, and its elevation component is detected by an elevation detector 61 and delivered to an output terminal 62.

FIG. 6 indicates how a radar system such as that of FIG. 9 may be simplified by the use of the present invention. FIG. 10, indicates how a three channel monopulse system (2-plane) may be simplified by the use of the present invention by reducing the required number of receivers from three to one. In this case, the range signal $\epsilon$ is passed to an adder 63 and the two error signals $\Delta E$ and $\Delta A$ are phase modulated at different frequencies before they are passed to the adder 63. Thus the elevation error signal $\Delta E$ is passed through a phase shifter 64 driven at a frequency $f_1$ by a drive 65, and the azimuth error signal $\Delta A$ is passed through a phase shifter 66 driven at a frequency $f_2$ by a drive 67.

The signal output of the adder 63 is passed to a mixer 68 where it is modulated by a local oscillator 69. From the mixer the signals pass to a single receiver 70 where they are amplified and translated. From the output connections provided for the receiver 70, the range error signal is delivered to an output terminal 71, the elevation error signal is delivered to an output terminal 73 through a filter 72 which is tuned to the frequency $f_1$ of the phase shifter 64, and the azimuth error signal is delivered to an output terminal 75 through a filter 74 which is tuned to the frequency $f_2$ of the phase shifter 66.

As previously indicated, it is essential that the various receiver systems, such as those of FIGS. 1 and 9, have identical phase and/or amplitude characteristics (depending upon the type of system) throughout their dynamic range and under all operating conditions if proportional information is to be obtained in the different signal channels. The building of such receivers is thus very difficult. This difficulty is avoided by the system of FIG. 10 wherein a single receiver is utilized to amplify and translate all the signals. Other advantages of the system of FIG. 10 over that of FIG. 9 are that the number of mixers is reduced and that the phase shifter on the output side of the range signal receiver is eliminated.

The system of FIG. 11 accomplishes a similar result in a somewhat different manner. In this case, the azimuth error signal ΔA is passed through a 90° phase shifter 76 to an adder 77, the elevation error signal ΔE is combined with the azimuth error signal in the adder 77 and these two signals are passed through a phase shifter 78 to an adder 79, to the input of which the range signal ϵ is also applied.

The three signals available at the ouput of the adder 79 are amplified by a receiver 80. From the output of the receiver 80, the range signal is delivered at an output terminal 81 and the error signals are delivered through a filter 82 and a phase comparator 83 to the output terminals 84 and 85. The filter 82 is tuned to the same frequency as the phase shifter 78 so that it accepts only the error signals. The drive 86 of the phase shifter 78 also drives a reference generator 87 which functions with the phase comparator 83 to separate the error signals.

The system of FIG. 11 can be used in conjuction with a two-channel monopulse system utilizing one set of antennas and one hybrid set-up, in a manner such that the error signal is in phase with the sum signal for errors in one plane (amplitude monopulse) and is in phase quadrature for error signals in the other plane (phase monopulse). While the systems of FIGS. 8, 10 and 11 are shown without antennas, it is to be understood that each of these systems is associated with one or another of the antenna systems previously discussed.

We claim:

In a monopulse radar directional control system, the combination of, means for receiving monopulse signal radiation and deriving therefrom a range sum signal and azimuth and elevation difference signals in three separate signal channels, means connected with each of the difference-signal channels for modulating the signals therein at different frequencies, the signals in the sum-signal channel being unmodulated, means connected with the signal output ends of said three channels for receiving and adding the modulated and unmodulated signals therefrom, a single signal receiver connected to derive and translate said added signals from said last-named means to an output terminal therefor, means connected with said output terminal for deriving therefrom a control signal representing the sum signal and an indication of the range traversed by received monopulse radiation signals, and means including band-pass filters connected with said output terminal and tuned each to one of said different modulating frequencies for deriving therefrom two control signals representing said difference signals and azimuth and elevation corrections in the directional control of said system.

References Cited by the Examiner

UNITED STATES PATENTS

| | | | |
|---|---|---|---|
| 2,559,644 | 7/1951 | Landon | 179—15 |
| 2,873,443 | 2/1959 | Raboy | 343—16.1 |
| 2,988,739 | 6/1961 | Hoefer et al. | 343—16 |
| 2,995,750 | 8/1961 | Holcomb et al. | |
| 3,141,164 | 7/1964 | Holcomb et al. | 343—16 |

OTHER REFERENCES

Proceedings of the IRE, vol. 49, No. 8, August 1961, A Monopulse Instrumentation System, p. 1328.

CHESTER L. JUSTIS, *Primary Examiner.*

KATHLEEN H. CLAFFY, *Examiner.*

P. M. HINDERSTEIN, R. E. KLEIN,
*Assistant Examiners.*